W. G. RUSSELL.
Whiffletree.
No. 24,760. Patented July 12, 1859.
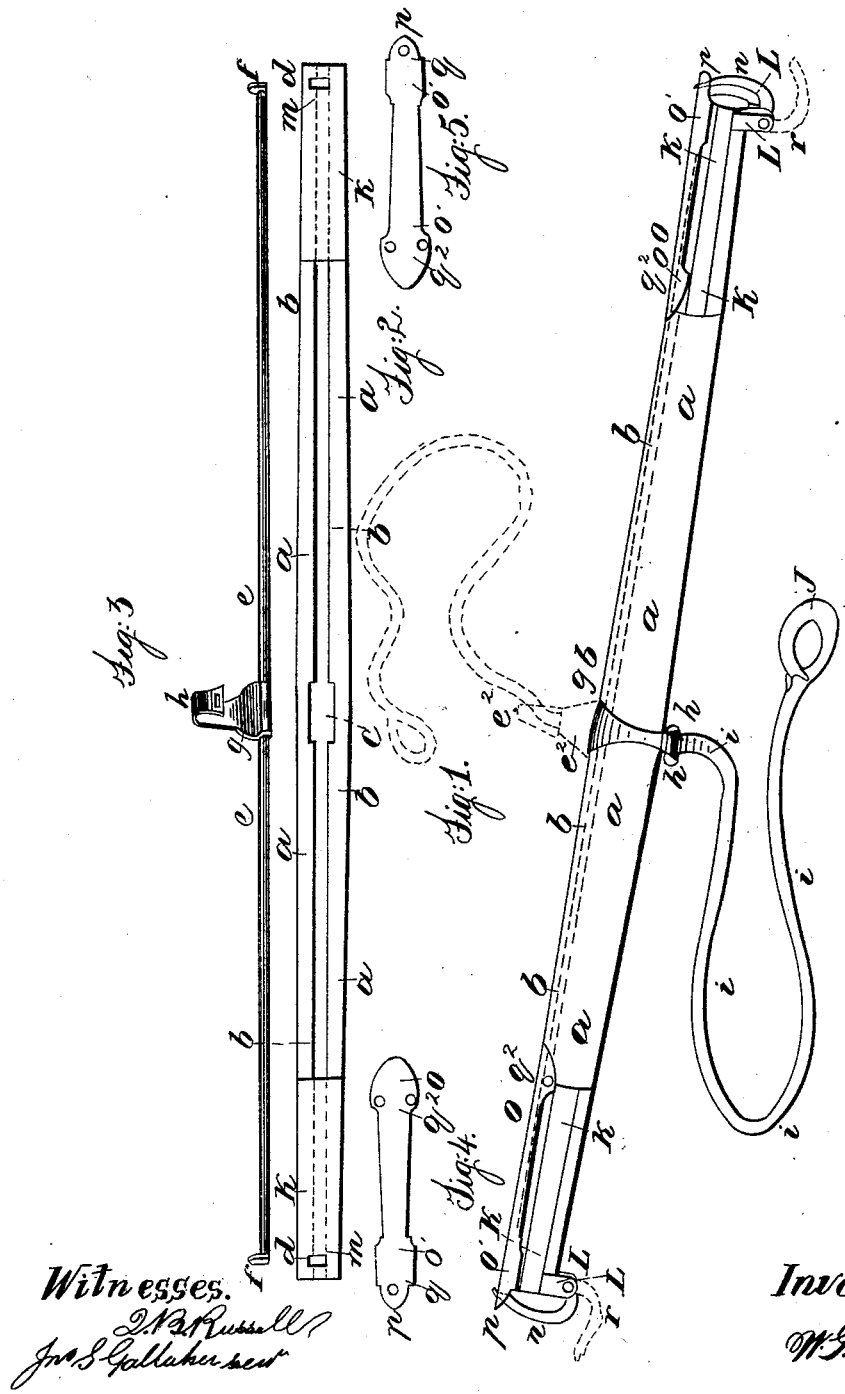

UNITED STATES PATENT OFFICE.

WILLIAM G. RUSSELL, OF WINCHESTER, VIRGINIA.

SELF-DETACHING WHIFFLETREE.

Specification of Letters Patent No. 24,760, dated July 12, 1859.

*To all whom it may concern:*

Be it known that I, WILLIAM G. RUSSELL, of Winchester, in the county of Frederick and State of Virginia, have invented and made certain new and useful Improvements in Detaching-Whiffletrees; and I do hereby declare that the following is a full, clear, and exact description of the same, reference being had to the accompanying drawings, making a part of this specification, Figure 1 representing a whiffletree complete. Fig. 2 represents the whiffletree, with the lever turn bar detached. Fig. 3 represents the lever turn bar. Figs. 4 and 5 represent the ferrule clasps.

The nature of my improvements and the construction thereof, I describe as follows. In Fig. 1, at $a, a, a, a$, is represented an ordinary wooden whiffle-tree bar in which is to be formed a groove or channel, $b, b, b, b$, Fig. 2 the whole length of the tree bar and in the center thereof at C, is a seat or mortise; while at the ends of the tree bar are formed smaller mortises $d$ $d$. Adapted to, and arranged, within this longitudinal groove or channel $d, d, d, d$, is a lever turn bar, of the shape as shown in Fig. 3, at $e, e, e, e$, having each end thereof bent over or shaped with eccentric formations $f, f$, while to the middle of the rod is a curved clasping lever $g$, formed with a slotted end $h$, to which is fastened a pull thong, or strap, $i, i, i, i$, with loop or ring $j$, attached. Over the ends of the whiffle-tree bar are ferrules, $k, k, k, k$, formed with ears $l, l$, and apertures, or slots, $m, m$, as in Figs. 1 and 2. To the ears $l, l$, are attached riveted or jointed hooks, $n, n$. Over the ferrules $k, k$, are spring clasps $o, o, o, o$, Figs. 4 and 5 the ends $p, p$, being formed with an eye $q, q$. These spring-clasps are riveted or screwed at $q^2, q^2$, over the ends of the whiffle tree-bar, and the end $p, p$, projects sufficiently over the extremity of the whiffle tree bar, so as to admit the end of the hook $n$, to enter the eye $q, q$, which can be readily brought about by a slight pressure in closing or pressing the hook, $n, n$.

In the application and operation of my improvements, the whiffle-tree is attached to the vehicle in the usual manner by a bolt or staple. The groove or channel side $b, b, b, b$, turned inwardly toward the vehicle. The traces or hitching straps are attached to the hooks, $n, n$, which can be opened by pulling upwardly and over the clasping lever $g$—$h, h$, which operation causes the lever-turn-bar $e, e, e, e$, as shown in dotted lines Fig. 1 to turn over as at $e^2, e^2$, thereby causing the bent or eccentric ends $f, f$, Fig. 3, to press against the spring clasps $o, o$, Fig. 1, thereby releasing the ends of the hooks, $n, n$, when the trace straps of the harness can be slipped over the hooks, and the hooks then closed up again in the position shown in Fig. 1. The dotted lines $r, r$, indicate the hooks when open.

In the running away, or when the harnessed animal should become fractious or unmanageable, the driver of the vehicle having the pull-thong or strap $i, i, i, i$, in hand, or in a convenient position, the pull-thong can be drawn, or jerked, when the clasping lever $g, h, h$, turns upwardly, thereby causing the spring clasps to lift, when the slightest movement of the unruly animal will pull, or slip the traces from off the hooks $n, n$, thus releasing, or detaching the traces, and separating the animal from the vehicle.

It will be perceived, that independently of the improved mode of detaching animals, that my devices the spring clasps $o, o$, and hooks $n, n$, afford a most ready and effectual means of hitching, which, together with the simplicity and cheapness of construction and durability, present many advantages unnecessary here to set forth.

What I claim as new and desire to have secured by Letters Patent of the United States; is—

A swingle, or whiffle-tree, provided with a lever-turn-bar $e, e, e, e$—$f, f$—$g$—$h, h$, as shown in Fig. 3, together with the spring clasps $o, o$, Figs. 1, 4, 5, and the hinged, or jointed hooking ferrules $k, k$—$l, l$—$n, n$, when constructed, and arranged, substantially as herein set forth and described.

W. G. RUSSELL. [L. S.]

Witnesses:
H. C. BUCKMASTER,
J. B. RUSSELL.